United States Patent
Leu et al.

(10) Patent No.: US 6,535,516 B1
(45) Date of Patent: Mar. 18, 2003

(54) SHARED MEMORY BASED NETWORK SWITCH AND THE NETWORK CONSTRUCTED WITH THE SAME

(75) Inventors: Kuo-Cheng Leu, Taipei Hsien (TW); Shu-Wei Wang, Hsinchu Hsien (TW); Kuo-Yen Fan, Nantou Hsien (TW); Hai-Yang Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/350,471

(22) Filed: Jul. 9, 1999

(30) Foreign Application Priority Data

Dec. 10, 1998 (TW) .......................................... 87120490 A

(51) Int. Cl.[7] .......................... H04L 12/28; H04L 12/56
(52) U.S. Cl. ................................... 370/395.72; 370/412
(58) Field of Search ............................... 370/428, 351, 370/352, 353, 354, 386, 389, 392, 396, 395.31, 399, 395.4, 395.72, 395.71, 400, 401, 402, 403, 404, 405, 409, 412, 413, 415, 417, 462; 365/189.04, 230.01, 230.05

(56) References Cited

U.S. PATENT DOCUMENTS 5,910,928 A * 6/1999 Joffe ...................... 365/230.05
5,920,566 A * 7/1999 Hendel et al. .............. 370/401

\* cited by examiner

*Primary Examiner*—Douglas Olms
*Assistant Examiner*—Phirin Sam
(74) *Attorney, Agent, or Firm*—Fish & Richardson P.C.

(57) ABSTRACT

A shared memory based network having a transferring network switch and a receiving network switch. In this network, each network switch has a stack, queues corresponding to output ports and a dared control port. The stack stores available buffer addresses of the shared memory. Each of the queues stores to-be-accessed buffer addresses of the corresponding output port. The shared control port is driven to indicate states of the shared memory based network, so that th stack of the transferring network switch is identical with the stack of the receiving network switch. The shared memory can be read by all output ports of both the transferring network switch and the receiving network switch according to their corresponding queues.

10 Claims, 10 Drawing Sheets

SHARED MEMORY BASED NETWORK SWITCH AND THE NETWORK CONSTRUCTED WITH THE SAME

BACKGROUND OF THE INVENTION

1. Field of the Invention

The present invention relates to a network switch and a network adapted for use with the network switch. In particular, the invention relates to a shared memory based network switch and a network constructed with the same, in which each network switch has a stack, several queues corresponding to output ports and a shared control port, so that the shared memory can be used more efficiently.

2. Description of the Related Art

Ethernet switch ICs are usually divided into three categories: shared bus based architecture, cross bar based architecture and shared memory base architecture.

FIG. 1 (Prior Art) is a diagram showing a conventional shared bus based architecture. As shown in FIG. 1, Ethernet switch ICs ESW1~ESW4 are respectively provided with a local packet memory PM1~PM4. When one of the Ethernet switch ICs receives an incoming packet, that Ethernet switch IC will make a local routing decision and write the packet to a free buffer of its local packet memory. If the packet is to be outputted to a destination port within the range of the original Ethernet switch IC, the packet is passed directly to the destination port. If the packet is to be outputted to a destination port outside the range of the original Ethernet switch IC, then the Ethernet switch IC will send a command through the shared bus and command the destined Ethernet switch IC to prepare a free buffer. The original Ethernet switch then sends the packet through the shared bus to the destined Ethernet switch and releases the storage space. Thereafter, the destined Ethernet switch IC stores the packet and outputs the packet to the destination port.

FIG. 2 (Prior Art) is a diagram showing a conventional cross bar based architecture. As shown in FIG. 2, Ethernet switch ICs ESW5~ESW8 are connected to an arbitrator AR1 and are respectively provided with a packet memory PM5~PM8. When one of the Ethernet switch ICs transfers an outgoing packet, this Ethernet switch IC will send a command to instruct the arbitrator AR1 to establish a point-to-point interconnection, so that the packet can be sent from the transferring Ethernet switch IC to the destined Ethernet switch IC.

FIG. 3 (Prior Art) is a diagram showing a conventional point-to-point shared memory based architecture. As shown in FIG. 3, Ethernet switch ICs ESW9~ESW12 are connected to a shared memory M1. A central queue manager COM1 is used to control the shared memory M1, for example, by allocation or release of a free buffer (not shown) in the shared memory M1.

FIG. 4 (Prior Art) is a diagram showing a conventional meshed shared memory based architecture. As shown in FIG. 4, four Ethernet switch ICs ESW13~ESW16 are interconnected to each other as a mesh (that is, each of the four Ethernet switch ICs is connected to the other three), and all packets are parallelly stored in four packet memories PM13~PM16 which are dedicated to a respective one of the four Ethernet switch ICs ESW13~ESW16.

However, each of the mentioned architectures has its drawbacks.

In the shared bus based architecture of FIG. 1, when one of the Ethernet switch ICs receives an incoming packet, this Ethernet switch IC will store the packet in its local packet memory, then directly output the packet to a destination port (if the destination port is within the range of the original Ethernet switch IC) or indirectly output this packet through another destined Ethernet switch IC (if the destination port is outside the range of the original Ethernet switch IC). Using this architecture, it is possible for a packet to be moved and copied two or more times, which reduces the efficiency of the shared memory. Although this architecture can provide multicast services, its quality of services (QOS) is fair.

In the cross bar based architecture of FIG. 2, the arbitrator AR1 is used to establish a point-to-point interconnection so that the packet can be transferred to the destined Ethernet switch IC. However, with this architecture, it takes a two-cycle await time to transfer a packet. Also, this cross bar based architecture cannot support multicast services or good quality of services. Head-of-line blocking is also possible.

In the point-to-point shared memory based architecture of FIG. 3, Ethernet switch ICs are connected to a shared memory. Therefore, it only takes a one-cycle await time to transfer a packet, and multicast services and good quality of services can be supported. However, an extra central queue manager is required, making single chip solutions impossible.

The meshed shared memory based architecture of FIG. 4 also only requires a one-cycle await time to send a packet; multicast services and good quality of services can be supported; and single chip solutions can be supported. However, a meshed shared memory based architecture is complicated and does not allow for easy expansion.

SUMMARY OF THE INVENTION

Therefore, it is an object of the present invention to provide a shared memory based network switch and a network including the same, the shared memory based network switch requiring only a one-cycle await time to transfer a packet.

It is another object of the present invention to provide a shared memory based network switch and a network including the same, which can support multicast services and good quality of services.

It is another object of the present invention to provide a shared memory base network switch and a network including the same, which can support single chip solutions and can be expanded easily because of its simple structure.

To realize the above and other objects, the present invention provides a shared memory based network including a transferring network switch and a receiving network switch. Each network switch includes a stack, several queues of corresponding output ports and a shared control port. The stack stores available buffer addresses of the shared memory. Each of the queues stores to-be-accessed buffer addresses of the corresponding output port. The shared control port is driven to indicate various states of the network, so that the stack of the transferring network switch is identical with the stacks of the receiving network switches at all times, and the shared memory is read by all the output ports of both the transferring network switch and the receiving network switch according to the corresponding queues.

The present invention also provides a shared memory based network switch which is connected to a shared memory through a shared bus. The shared memory includes several buffers. The network switch includes a stack, several queues corresponding to output ports and a shared control port. The stack stores available buffer addresses of the shared memory. Each of the queues stores to-be-accessed buffer addresses of the corresponding output port. The shared control port is driven to various states so that the stack can pop out or push in a top buffer address, and the shared memory can be read by all the output ports according to the corresponding queues.

BRIEF DESCRIPTION OF THE DRAWINGS

Further objects, features and advantages of the present invention will become apparent from the following detailed description of a preferred embodiment of the invention with reference to the accompanying drawings.

DETAILED DESCRIPTION OF THE PREFERRED EMBODIMENT

To achieve the above objects, the shared memory based network of the present invention includes a stack and several queues in each network switch. These network switches are interconnected together within the network by a shared control port. The stack is used to store available buffer addresses of the shared memory. Each of the queues corresponds to a respective output port and is used to store to-be-accessed buffer addresses for the output port. The shared control port is driven to indicate various states of the network, so that the stack for each network switch is identical and all output ports can access the shared memory according to the corresponding queues.

Figure 1:
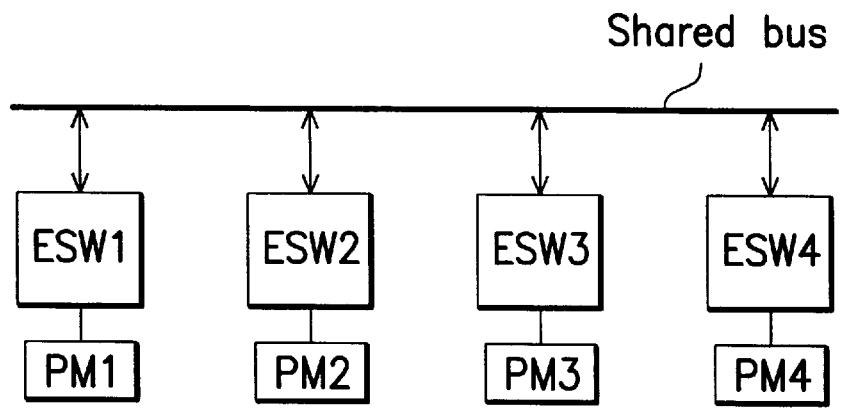
FIG. 1 is a diagram showing a conventional shared bus based network.
Figure 2:
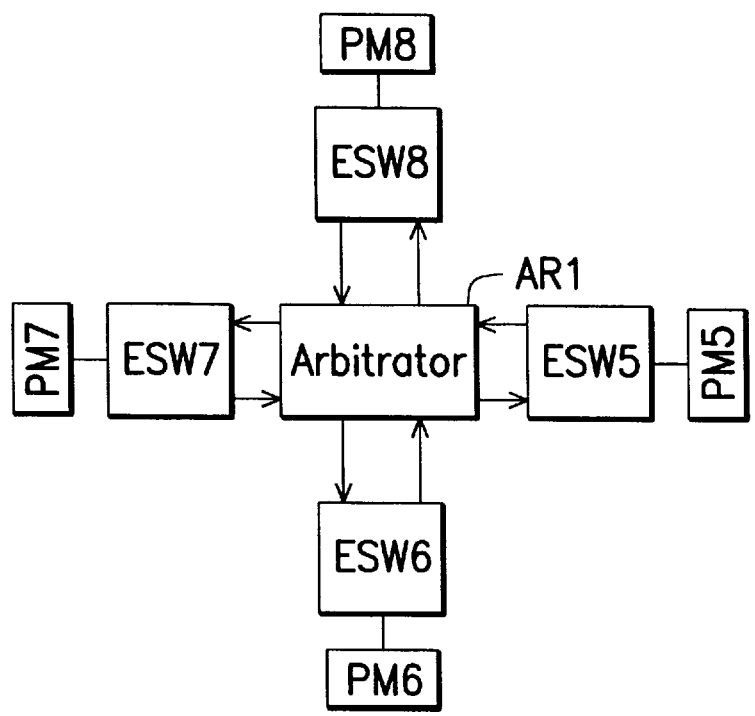
FIG. 2 is a diagram showing a conventional cross bar based network.
Figure 3:
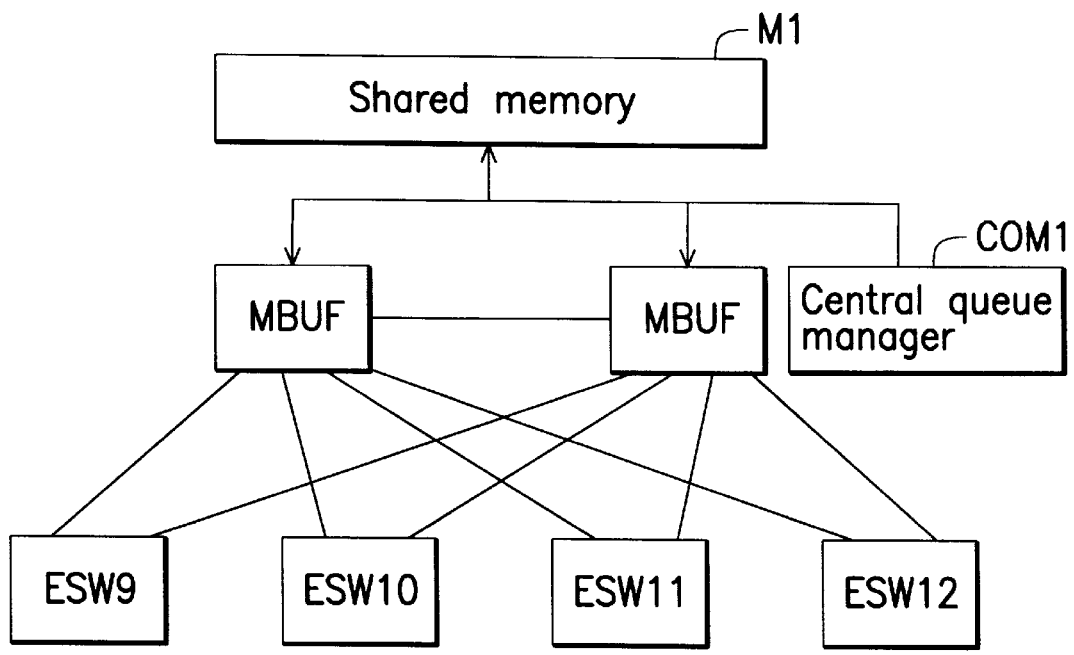
FIG. 3 is a diagram showing a conventional point-to-point shared memory based network.
Figure 4:
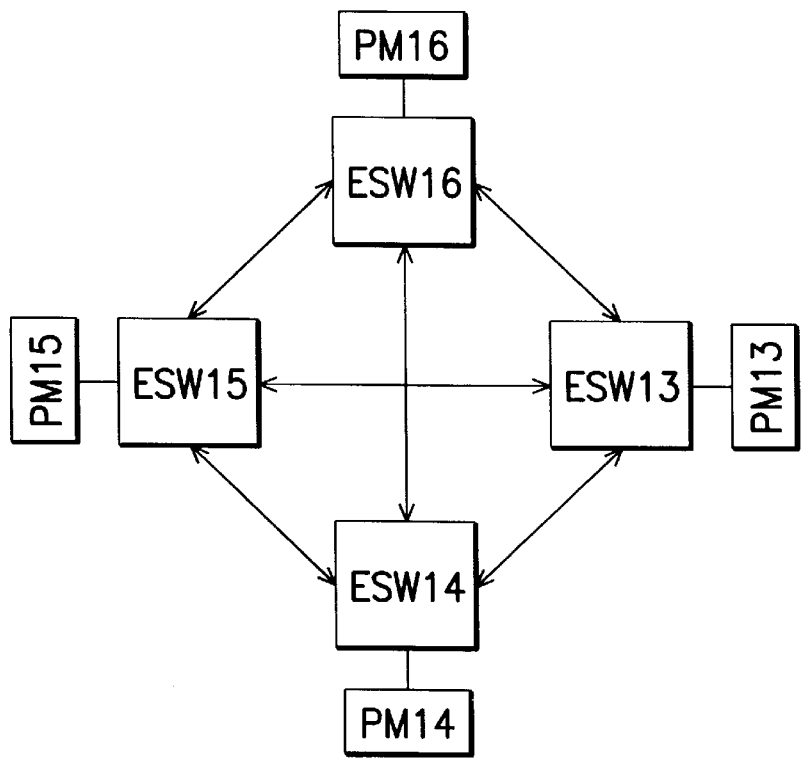
FIG. 4 is a diagram showing a conventional meshed shared memory based network.
Figure 5:
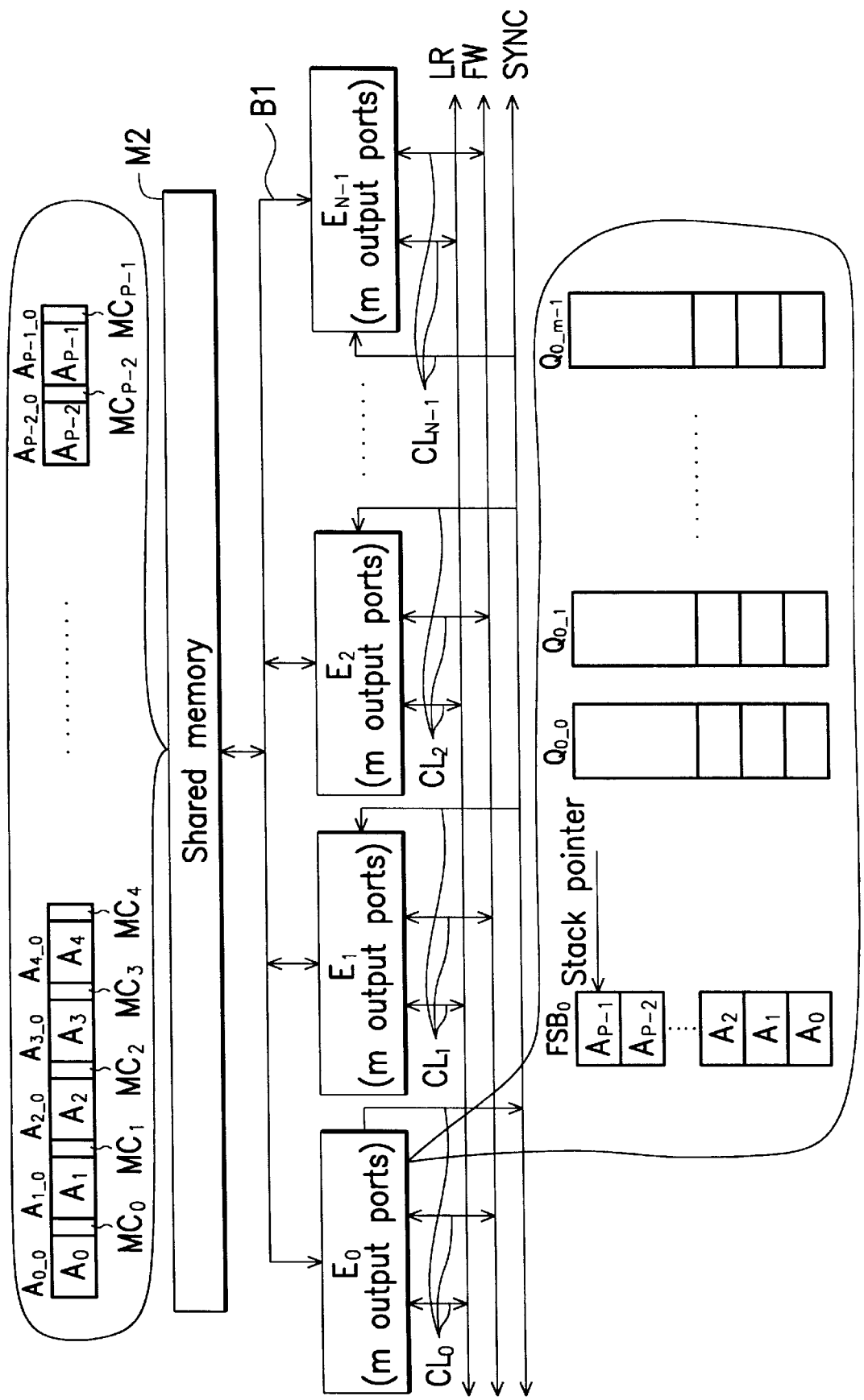
FIG. 5 is a diagram showing a shared memory based network of the present invention.

Referring to FIG. 5, a diagram showing a shared memory based network of the present invention is shown. The network includes a shared memory M2 having P buffers and N network switches $E_0 \sim E_{N-1}$, each having m output ports, where P, N and m are all integers.

The P buffers of the shared memory M2 are represented by $A_0 \sim A_{P-1}$ and have starting addresses at $A_{0\_0} \sim A_{P-1\_0}$, respectively. Each buffer is a predetermined number bytes in length, followed by a multicast count $MC_0 \sim MC_{P-1}$. In this particular embodiment, each buffer is 1536 bytes in length.

The N network switches $E_0 \sim E_{N-1}$ are connected to the shared memory M2 through a shared bus B1. Each network switch $E_0 \sim E_{N-1}$ includes a shared control port CL, a stack FSB and m queues Q corresponding to the m output ports. As shown in FIG. 5, the N network switches $E_0 \sim E_{N-1}$ have their respective control ports $CL_0 \sim CL_{N-1}$ connected to each other. Each stack is structured as a first-in-last-out (FILO) memory (e.g., a dynamic linked memory) which stores available buffer addresses of the shared memory M2. Each queue is structured as a first-in-first-out (FIFO) memory which stores to-be-accessed buffer addresses of the shared memory M2 for its corresponding output port. The shared control port is driven to various states corresponding to states of the network. The switches respond to these states such that stacks in the network are identical at all times and each output port in the network can access the shared memory according to their corresponding queues.

Hereafter is a detailed description of an embodiment in which the control port $CL_0$ includes a synchronization signal SYNC, a First_Write signal FW and a Last_Read LR signal.

Figure 6:
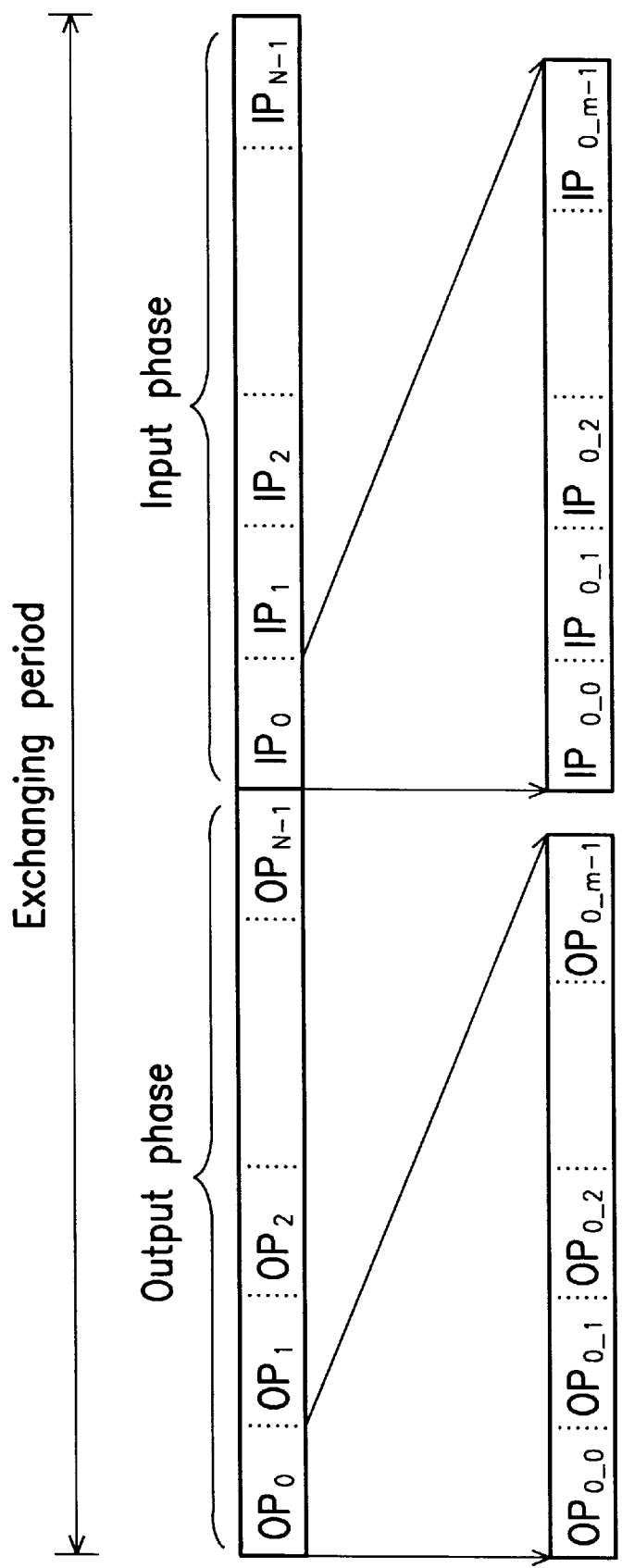
FIG. 6 is a diagram showing exchanging cycles for all output ports obtained by time division multiplexing (TDM)

The synchronization signal SYNC is used to define exchanging cycles for all output ports of the network switches $E_0 \sim E_{N-1}$. FIG. 6 is a diagram showing the exchanging cycles provided by time-division-multiplexing (TDM) scheme. As shown in FIG. 6, a complete working cycle includes an input phase IP and an output phase OP. The output phase OP is divided into N frames $OP_0 \sim OP_{N-1}$ corresponding to the N network switches $E_0 \sim E_{N-1}$. Each frame (such as $OP_0$) is further divided into m time slots $OP_{0\_0} \sim OP_{0\_m-1}$ corresponding to the m output ports of a switch. Thus, all output ports can transfer a packet via the exchanging cycle. Similarly, the input phase IP is also divided into N frames $IP_0 \sim IP_{N-1}$ corresponding to the N network switches $E_0 \sim E_{N-1}$. Each frame (such as $IP_0$) is further divided into m time slots $IP_{0\_0} \sim IP_{0\_m-1}$ corresponding to the m output ports of a switch. Thus, each output port has two slots to read from and write to the shared memory M2 via each exchanging cycle.

The First_Write FW signal and the Last_Read LR signal are used to indicate the state of the shared memory M2 so that the shared memory M2 can be efficiently shared by all the network switches $E_0 \sim E_{N-1}$.

When an incoming packet PK1 is first written to the shared memory M2, the receiving network switch (such as $E_1$) stores he packet PK1 in a free buffer of the shared memory M2 according to a top address (such as $A_3$) of the stack $FBS_1$. The receiving switch then pops the top address $A_3$ from the stack $FBS_1$ and drives the shared control ports $CL_0 \sim CL_{N-1}$ to a "First_Write" status which pops a top address (i.e., $A_3$) from the stacks $FBS_0$, $FBS_2 \sim FBS_{N-1}$ of the other network switches $E_0$, $E_2 \sim E_{N-1}$. Thus, the First_Write status informs all the network switches $E_0 \sim E_{N-1}$ that the buffer addressed $A_3$ is already in use.

When the packet PK1 is completely written to the shared memory M2, the network switch $E_1$ sends a routing result (including destined output ports of the packet PK1) through the shared bus B1 and drives the control ports $CL_0 \sim CL_{N-1}$ to a "Routing_Result" status, which stores the address A3 from the shared bus B1 in the queues corresponding to the destined output ports. This process informs all the destined output ports that the packet PK1 has been stored in the buffer addressed $A_3$.

When the shared memory M2 is to be read from one of the output ports, the network switch including this output port (such as $E_0$) reads a buffer of the shared memory M2 according to a bottom address (such as $A_3$) output from the corresponding queue when the reading is completed, the switch drives the control ports $CL_0 \sim CL_{N-1}$ to a "Last_Read" status, which pushes the address $A_3$ to all the stacks $FBS_0 \sim FBS_{N-1}$ thereby informing all the network switches $E_0 \sim E_{N-1}$ that the buffer addressed $A_3$ is released.

When an error occurs during the writing of the packet PK1 to the shared memory M2, to ensure that the buffer addressed $A_3$ can be utilized again, the network switch $E_1$ drives the control ports $CL_0 \sim CL_{N-1}$ to an "Error" status, which halts the writing of the shared memory M2 and pushes the earlier popped address $A_3$ back on to all the stacks $FBS_0 \sim FBS_{N-1}$. This informs all the network switches $E_0 \sim E_{N-1}$ that the buffer addressed $A_3$ is released.

Figure 7:
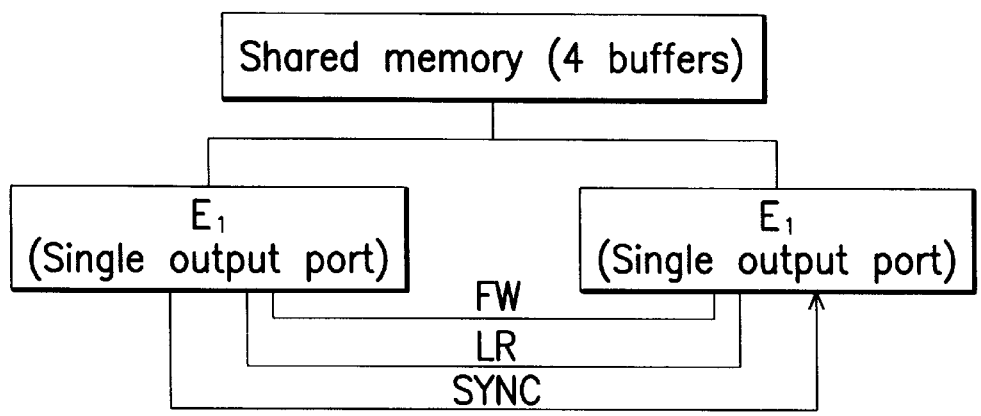
FIG. 7 is a diagram showing a simplified shared memory based network of the present invention.

FIG. 7 is a diagram showing a simplified shared memory based network of the present invention. As shown in FIG. 7, the network only includes two network switches $E_1 \sim E_2$, a shared memory M2 having four buffers $A_0 \sim A_3$, and a simplified control port CL that offers a First_write signal FW and a Last_Read signal.

FIG. 8A through 8E are diagrams showing various operations of the shared memory based architecture in FIG. 7.

Figure 8A:
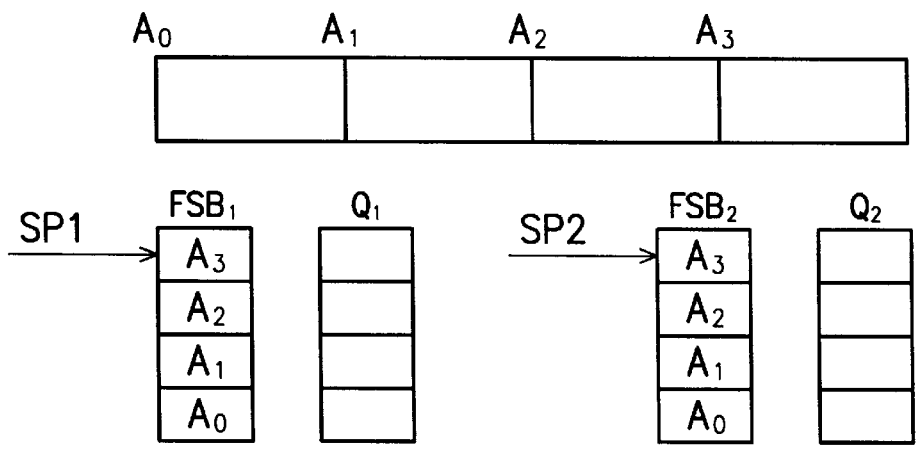
FIG. 8A~8E are diagrams showing various states of the shared memory based network as shown in FIG. 7.

Initially, as shown in FIG. 8A, both of the stacks $FBS_1 \sim FBS_2$ of the network switches $E_1 \sim E_2$ are sequentially stacked with buffer addresses $A_0 \sim A_3$ indicating that four buffers $A_0 \sim A_3$ of the shared memory M2 are available. Both of the queues $Q_1 \sim Q_2$ are empty, indicating that the shared memory M2 is not to be read from the corresponding output ports.

Figure 8B:
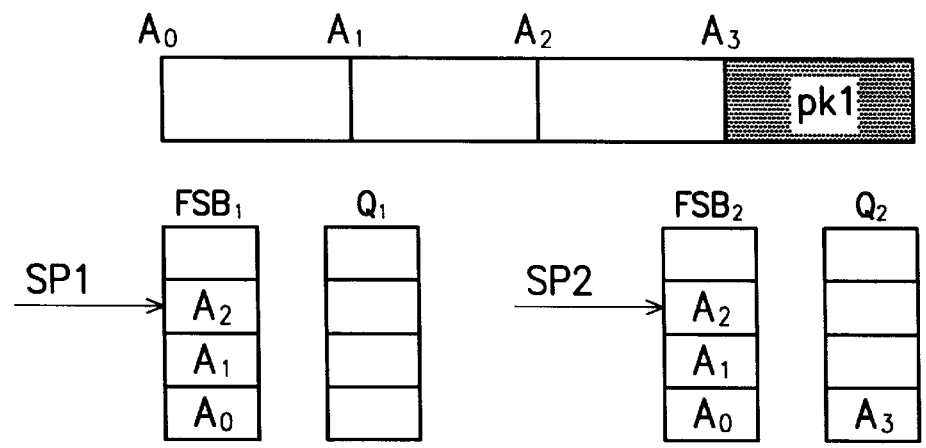

As shown in FIG. 8B, when an incoming packet PK1 is to be written to the shared memory M2 from the network switch $E_1$, the network switch $E_1$ writes the packet PK1 into a free buffer of the shared memory M2 according to a top address $A_3$ of the stack $FBS_1$. The switch $E_1$ pops the top address $A_3$ when the packet PK1 is first written and pulls the First_Write FW signal low to drive the control port CL to a "First_Write" status. Under this status, the stack $FBS_2$ of the network switch $E_2$ also pops a top address (i.e., $A_3$). After the packet PK1 has been completely written to the shared memory M2, the network switch $E_1$ pulls both the First_Write signal FW and the Last_Read signal LR low to drive the control port CL to a "Routing_Result" status, and sends a routing result (including destined output ports of the packet PK1) to place the address $A_3$ in the corresponding queue $Q_2$.

Figure 8C:
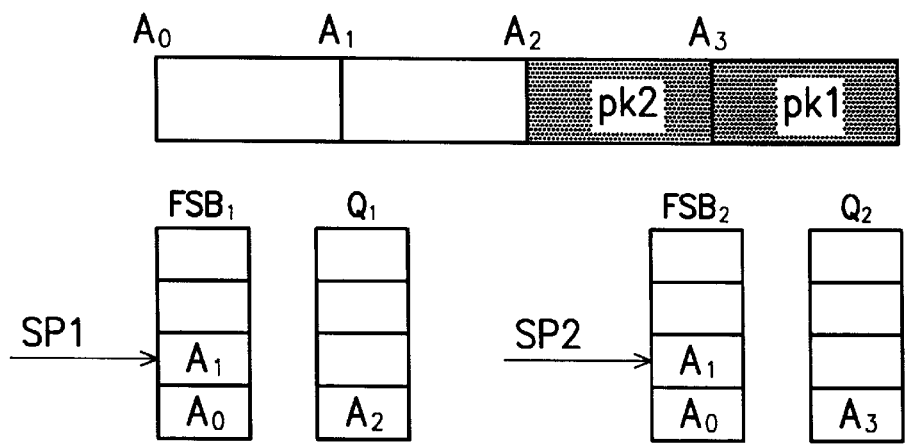

Similarly, as shown in FIG. 8C, when another packet PK2 is to be written to the shared memory M2 from the network switch $E_2$, the network switch $E_2$ writes the packet PK2 into another free buffer of the shared memory M2 according to a top address $A_2$ of the stack $FBS_2$, pops the top address $A_2$ when the packet PK2 is first written, and pulls the First_Write signal low to drive the control port CL to a "First_Write" status. The stack $FBS_1$ of the network switch $E_1$ pops a top address (i.e., $A_2$). After the packet PK2 has been completely written to the shared memory M2, the network switch $E_2$ pulls both the First_Write signal FW and the Last_Read signal LR low to drive the control port CL to a "Routing_Result" status, and sends a routing result (including destined output ports of the packet PK2) to input the address $A_2$ to the corresponding queue $Q_1$.

When the network switch $E_1$ is interrupted for any reason during the writing of the packet PK1 to the shared memory M2, (such as an unexpected error), the buffer addressed $A_3$ can not be used again because the address $A_3$ stored in the stacks $FBS_1 \sim FBS_2$ has already been popped When the packet PK1 was first written. Therefore, the utilization of the shared memory M2 can be inefficient. To overcome this potential inefficiency when the writing of the shared memory M2 is irregularly stopped, the network switch $E_1$ pulls the Last_Read signal LR low to drive the control port CL to an "Error" status, and pushes the address $A_3$ back on the stacks $FBS_1 \sim FBS_2$, as shown in FIG. 8A.

Similarly, when the network switch $E_2$ is interrupted for any reason during the writing of the packet PK2 to the shared memory M2, the buffer addressed $A_2$ can not be used again because the address $A_2$ stored in the stacks $FBS_1 \sim FBS_2$ has already been popped when the packet PK2 was first written. Thus, when the writing of the shared memory M2 is irregularly stopped, the network switch $E_2$ pulls the Last_Read signal LR low to drive the control port CL to an "Error" status, and stores the address $A_2$ back to the stacks $FBS_1 \sim FBS_2$, as shown in FIG. 8B.

Figure 8D:
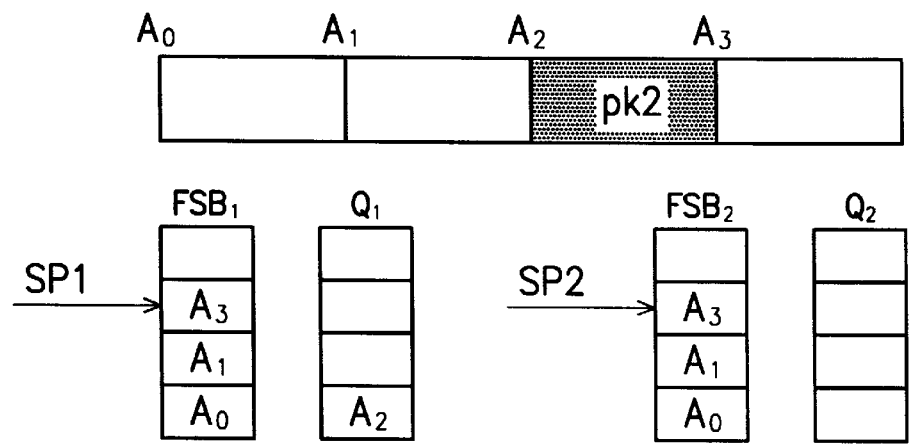

As shown in FIG. 8D, when the shared memory M2 is to be read from the output port of the network switch $E_2$, the network switch $E_2$ reads a buffer of the shared memory M2 according to an address $A_3$ output from the FIFO queue $Q_2$, and pulls the Last_Read signal LR low when the buffer $A_3$ is read completely to drive the control port CL to a "Last_Read" status, which stores the address $A_3$ to the stacks $FBS_1 \sim FBS_2$.

Figure 8E:
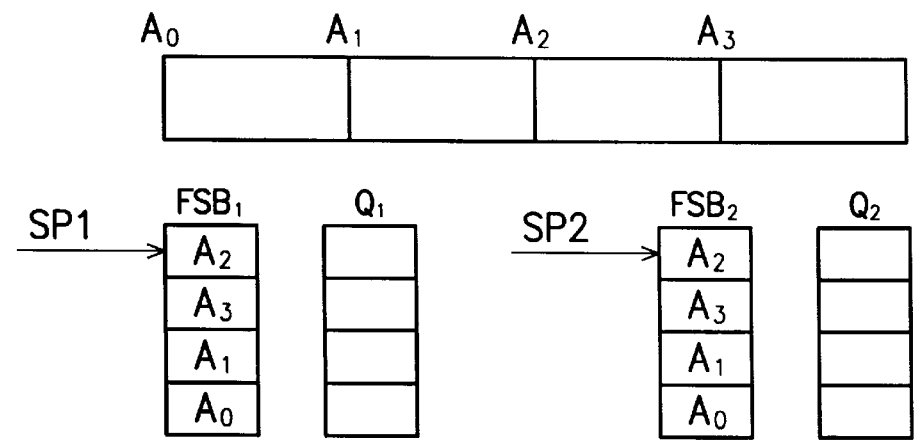

Similarly, as shown in FIG. 8E, when the shared memory M2 is to be read from the output port of the network switch $E_1$, the network switch $E_1$ reads a buffer of the shared memory M2 according to an address $A_2$ output from the FIFO queue $Q_1$, and pulls the Last_Read signal LR low when the buffer $A_2$ is read completely to drive the control port CL Lo a "Last_Read" status, which stores the address $A_2$ to the stacks $FBS_1 \sim EBS_2$.

FIG. 9A through 9D are diagrams showing control signals of the shared memory based architecture according to the present invention.

Figure 9A:
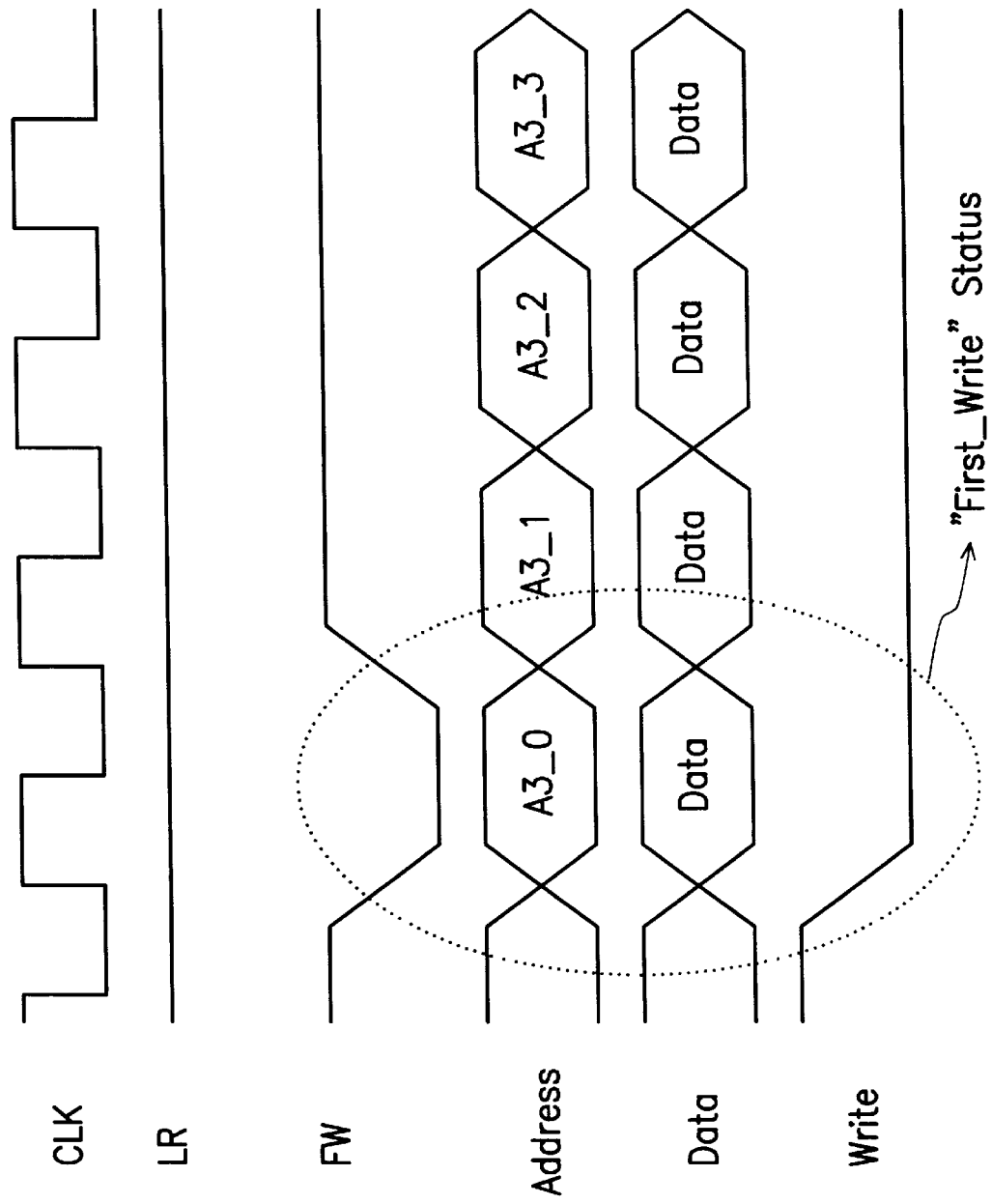
FIG. 9A~9D are diagrams showing control signals of the control port of the present invention.
Figure 9B:
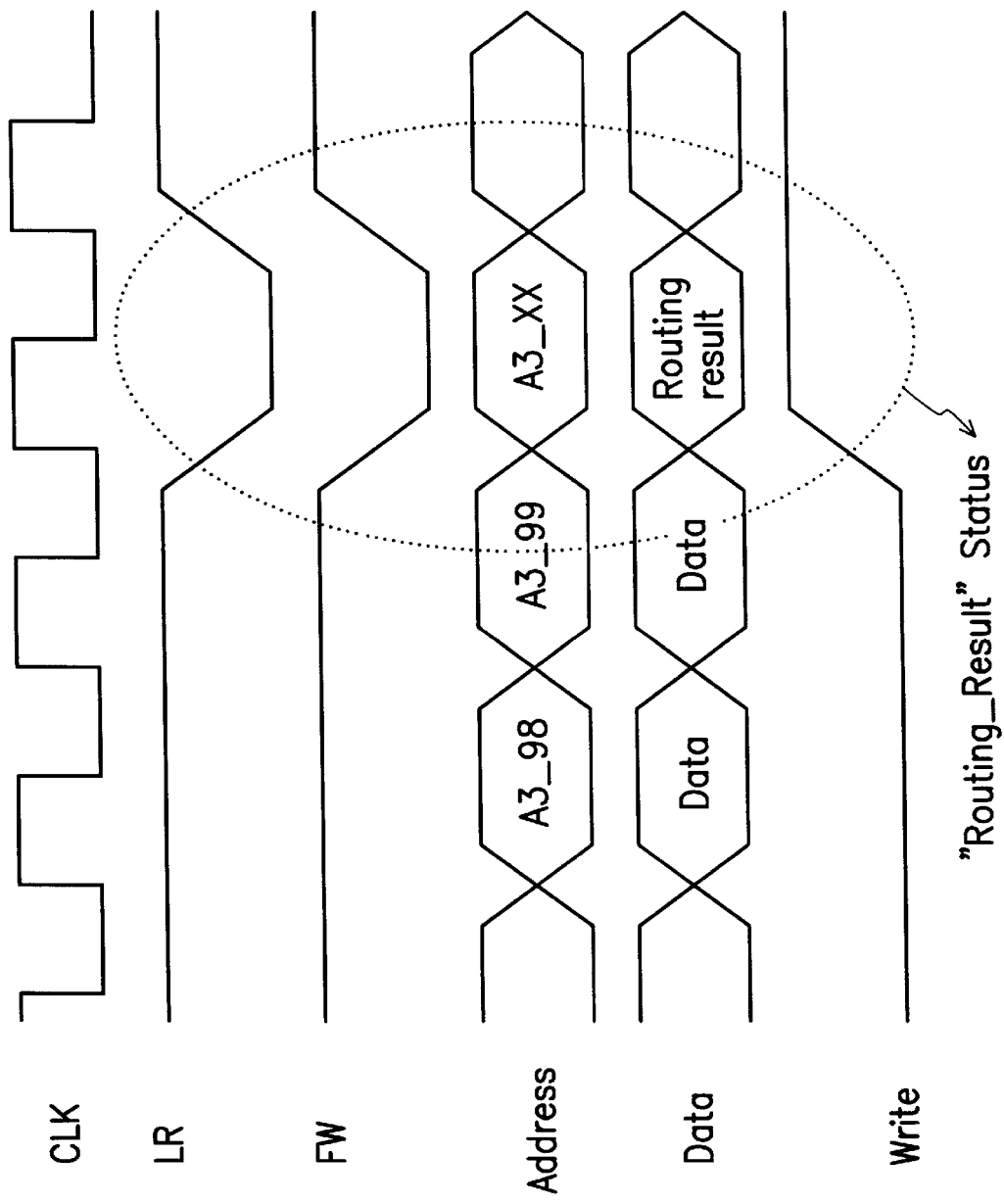

During the writing of the shared memory M2, when the packet is first written to the shared memory M2, the control port CL is driven to the "First_Write" status (the First_Write signal is pulled low), and all of the stacks pop a buffer address, as shown in FIG. 9A. When the packet is completely written to the shared memory M2, the control port CL is driven to the "Routing_Result" status (the First_Write signal and the Last_Read signal are both pulled low), and all of the queues input a buffer address according to the routing result from the shared bus, as shown in FIG. 9B.

Figure 9C:
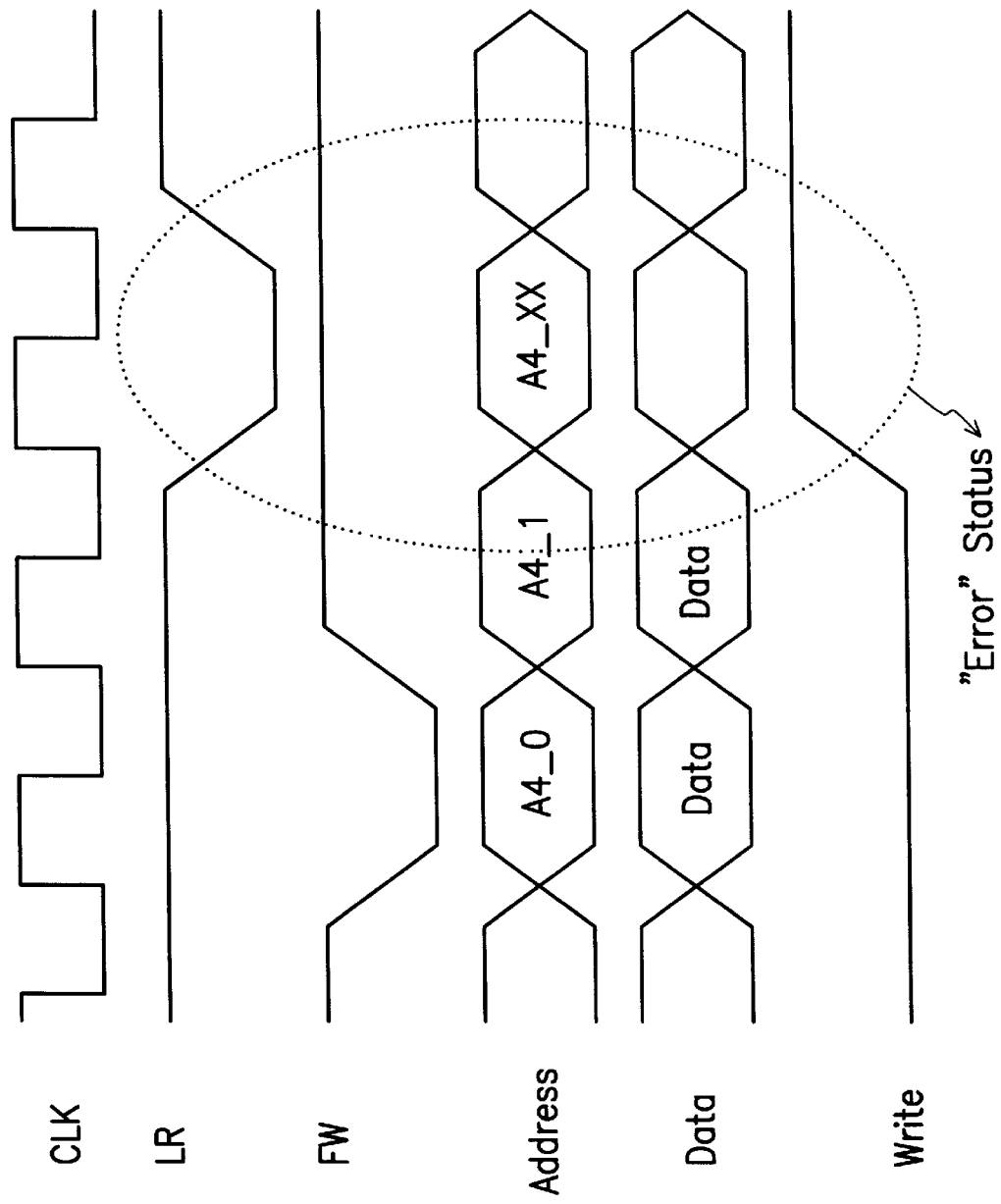

During the writing of the shared memory M2, an error may occur. In this case, the control port CL is driven to the "Error" status (the Last_Read signal is pulled low), and the earlier popped address is pushed back to all the stacks, as shown in FIG. 9C.

Figure 9D:
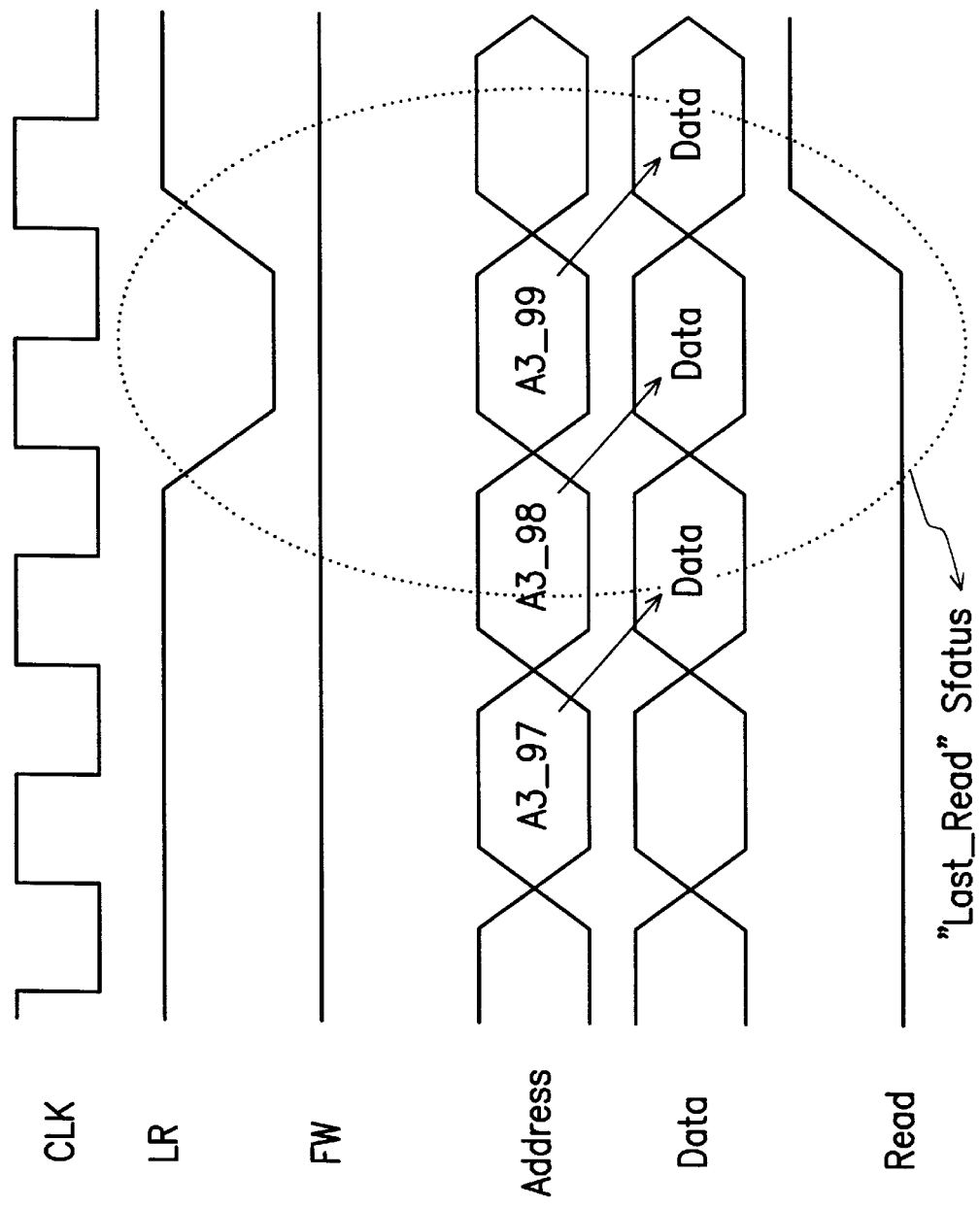

Further, during the reading of the shared memory M2, when the corresponding buffer is read completely, the control port is driven to the "Last_Read" status (the Last_Read signal is pulled low), and the buffer address is restored to all the stacks, as shown in FIG. 9D.

Although the above description focused on packet exchanges between two ports, the network switch of the present invention also supports multicast services. Recall that, when a packet is completely written to a buffer, the control port is driven to the "Routing_Result" status and the routing result is inputted to certain queues. The routing result includes destined output ports of the packet. As an example, the routing result can be a bit map, each bit indicating whether or not the corresponding output port reads the transferred packet. In this case, a multicast count MC (as shown in FIG. 5) can be added at the end of the corresponding buffer, representing the number of output ports the packet is to be sent. The multicast count MC is decreased by one each time the buffer is read, and the control port CL is entered the "Last_Read" status when the multicast count reaches zero.

Further, the shared memory in the present architecture can be read only by assigned output ports, therefore the quality of service can be maintained.

Summing up the above, in the shared memory based network switch of the present invention and the network constructed with the same, it only takes a one-cycle await time to transfer a packet, so the shared memory can be used more efficiently. In addition, it can also support multicast services and good quality of services. It also permits single chip solutions and can be easily expanded because of its simple structure.

Table 10 compares the performance between the shared memory based network of the present invention and some conventional networks.

TABLE 10

|  | Await time (cycles) | Through-put | Memory Utili-zation | Multi-cast support/ QOS support | Single Chip Solution | Single Chip Hier-archy |
|---|---|---|---|---|---|---|
| Shared bus | 2 | high | low | yes/fair | yes | un-fixed |
| Cross bar | 2 | low | low | no/poor | no | fixed |
| Point-to-point Shared memory | 1 | high | high | yes/good | no | fixed |
| Meshed Shared memory | 1 | high | high | yes/good | yes | fixed |
| FW_LR Shared memory | 1 | high | high | yes/good | yes | un-fixed |

It should be understood that the present invention is not limited to the preferred embodiment as disclosed above. Variations and modifications can be made by those who are skillful in the art without departing from the spirit and scope of the present invention as defined in the appended claims. Thus, this invention is not to be limited to the disclosed embodiment except as required by the appended claims.

What is claimed is:

1. A shared memory based network comprising a transferring network switch and a receiving network switch, each network switch having a stack, a plurality of queues corresponding to a plurality of output ports, and a shared control port, the stack storing available buffer addresses of the shared memory, each of the queues storing to-be-accessed buffer addresses of the corresponding output port, the share control port driven to indicate states of the shared memory based network so that the stack of the transferring network switch is identical with the stack of the receiving network switch and the shared memory being read by the output ports of both the transferring network switch and the receiving network switch according to the corresponding queues.

2. The shared memory based network as claimed in claim 1, wherein the shared control port has a synchronization signal to define exchanging cycles for the output ports of both the transferring network switch and the receiving network switch.

3. The shared memory based network as claimed in claim 2, wherein the exchanging cycles are obtained by time-division multiplexing (TDM) using the synchronization signal.

4. The shared memory based network as claimed in claim 1, further including a multicast count for each buffer to indicate the number of times the buffer is to be accessed.

5. A shared memory based network switch connecting to shared memory through a shared bus, the shared memory having a plurality of buffers, the network switch comprising:

a stack storing available buffer addresses of the shared memory;

a plurality of queues corresponding to a plurality of output ports, each of the queues storing to-be-accessed buffer addresses of the corresponding output port, each output port reading the shared memory according to the port's corresponding queue; and a shared control port driven to various states so thy the stack pops out or pushes in a top buffer address.

6. The shared memory based network switch as claimed in claim 5, wherein the shared control port has a synchronization signal to define exchanging cycles for all the output ports.

7. The shared memory based network switch as claimed in claim 6, wherein the exchanging cycles for all the output ports are obtained by time-division multiplexing (TDM) using the synchronization signal.

8. The shared memory based network switch as claimed in claim 5, further including a multicast count for each buffer indicate the number of times the buffer is to be accessed.

9. The shared memory based network switch as claimed in claim 5, wherein the stack is structured as a first-in-first-out memory.

10. The shared memory based network switch as claimed in claim 5, wherein the stack is structured as a dynamically linked memory.

* * * * *